INVENTOR
CHARLES W. ROSS

BY William G. Miller Jr.

AGENT

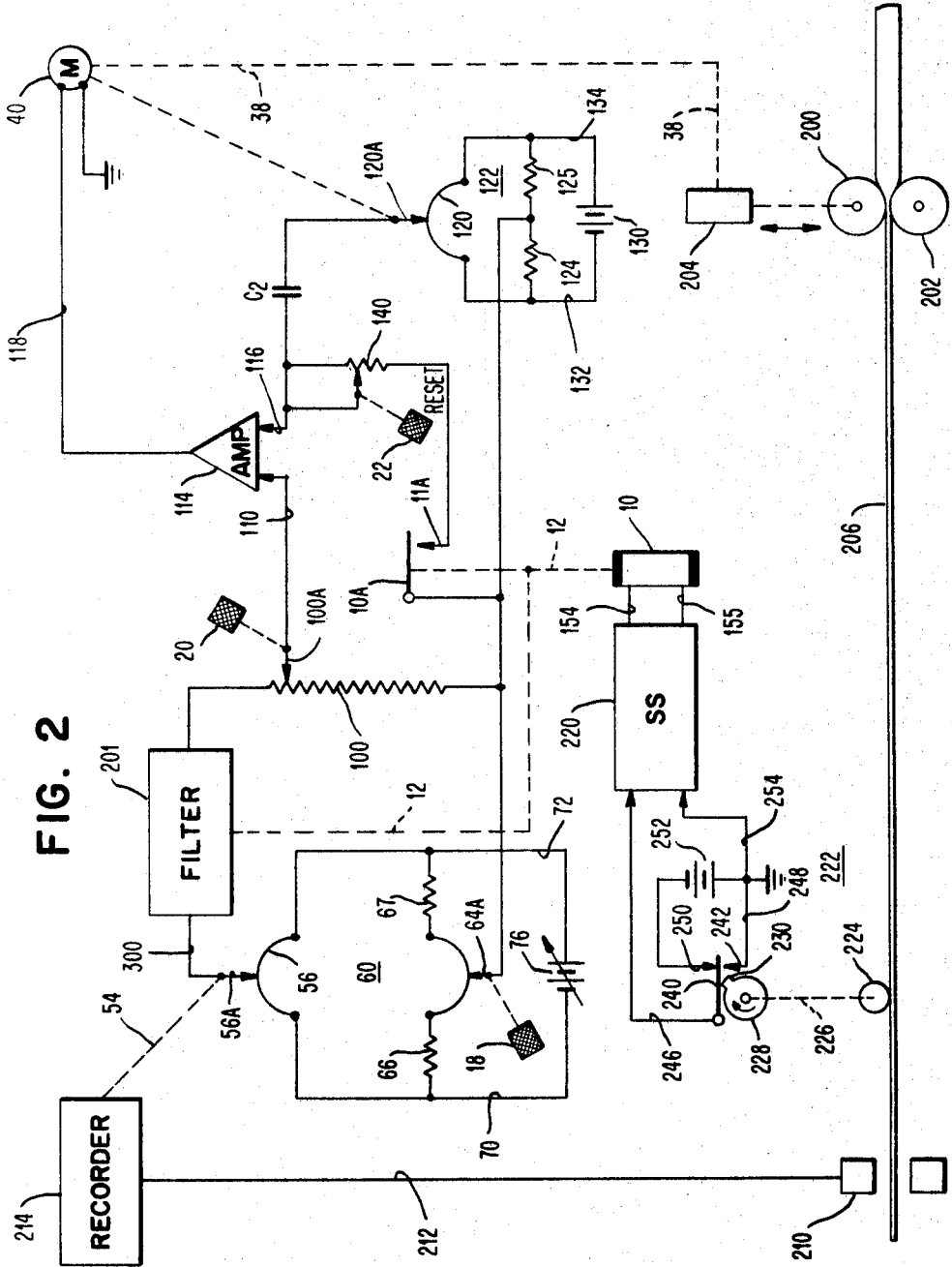

United States Patent Office 3,391,316
Patented July 2, 1968

3,391,316
PROCESS CONTROLLER IN WHICH PROPORTIONAL AND RESET ACTIONS ARE ADAPTIVELY MODIFIED BY PROCESS LOAD
Charles W. Ross, Hatboro, Pa., assignor to Leeds & Northrup Company, a corporation of Pennsylvania
Filed Oct. 20, 1964, Ser. No. 405,039
22 Claims. (Cl. 318—18)

ABSTRACT OF THE DISCLOSURE

A process controller in which the proportional and reset actions are modified in accordance with a change in the process operating level or load. The modification of the proportional action is accomplished by varying the potential supply to the bridge circuit comparing the controlled variable and the set point in response to process load. The reset action is varied by means of a relay which connects the reset resistor for a fixed portion of successive periods which are varied by a pulse width modulator in dependence upon the process load.

This invention relates to adaptive process controllers and more particularly to a novel means for maintaining the response of such a controller at an optimum level as the characteristics of the process under control vary.

The conventional linear controller is useful and effective in the control of the many industrial processes which are linear in character as well as in a number of non-linear processes in which the operating level or load of the process varies over a sufficiently narrow range to allow the treatment of the process as if it were in reality linear in character. Many control applications, however, involve non-linear processes in which the operating level or load of the process varies over a sufficiently extensive range so that the conventional linear process controller cannot provide a suitably stable and effective control. In these later non-linear processes in order to apply a linear controller it is necessary that it be tuned at a load very close to the lowest value of the process load which is encountered in normal operation. With such tuning the control tends to act in a very sluggish manner when working at much higher load levels. This sluggishness results from a loss of loop gain and/or relative reduction in the reset control action when both the gain and the reset adjustment of the controller remain fixed throughout the range of load changes. Tuning at a higher load would on the other hand cause instability to occur at the lower load values without necessarily removing the sluggish nature of the control response at the higher load levels.

It has been found that an effective control of such non-linear processes over the full expected load range may require an adjustment of both the gain due to proportional control action as well as the reset rate as the load changes, the reset rate being the number of times per minute that proportional-position control action is repeated. Generally it is necessary to decrease the reset rate continuously as the process load is increased while the gain adjustment is increased as the load level increases.

For a still more effective adjustment of the controller to accommodate the load changes it is desirable to vary the value of the controller's rate time with load in addition to the adjustment of the reset rate and gain settings as above mentioned. Rate time may be defined as the time interval by which the rate action advances the effect of the proportional-position action. It has been found that rate time generally must be decreased as the load level increases.

More specifically it has been found that the gain of a process controller to be adaptive to a wide range of process conditions may be varied in accordance with a constant value plus a value directly related to the magnitude of the process condition for which the adaptation is required.

The reset rate on the other hand may advantageously be varied in accordance with the reciprocal of the sum of a constant related to the fixed portion of the system dynamics and a variable related to the reciprocal of the process condition adapted for.

The rate time for such a process controller should, on the other hand, be varied directly in accordance with the sum of a constant related to the fixed portion of the process dynamics and a variable related to the reciprocal of the process condition adapted for.

Many of the methods which have been utilized in the past to accomplish an adaptation of controller response to the load level at the process being controlled have inevitably been either complex in nature, expensive of manufacture, or difficult of adjustments, and some have incorporated several of these deficiencies. It is therefore an object of the present invention to provide an improved adaptive process controller.

Another object of this invention is the provision of an improved means for modifying the gain adjustment of a process controller in accordance with changes in the gain of the process.

A still further object of this invention is the provision of improved means for modifying the reset rate of a process controller in accordance with changes in the dynamic characteristics of the process.

It is a further object of this invention to provide an improved means for filtering noise signals at the input to a process controller without affecting the gain variations of the controller as established in response to the changes in process gain.

A further object of this invention is the provision of a simple and inexpensive means for modifying the parameters of the process controller in accordance with variable characteristics of the process.

In accordance with this invention there is provided a simple and inexpensive means for modifying both the proportional and reset responses of a process controller to vary their magnitudes with changes in process characteristics. This variation in response can be accomplished by a change in the average response as by periodically changing the controller response between two predetermined levels or the change in response may be made continuous in nature. Preferably, the change in proportional response is in accordance with a transfer function having a constant value plus a variable value related directly to the changing process characteristics, such as load. On the other hand the reset response is preferably varied in accordance with a transfer function containing a component which is a constant over the Laplace operator times a quantity which is the sum of a time constant of fixed value and a time constant varying as the reciprocal of the process characteristic, such as load.

For a more detailed understanding of the invention reference is made to the drawings in which:

FIG. 2 is a circuit diagram of a controller similar to that of FIG. 1 but which incorporates a modified means for varying the control response when a strip process having pure dead time is to be controlled.

Figure 1:
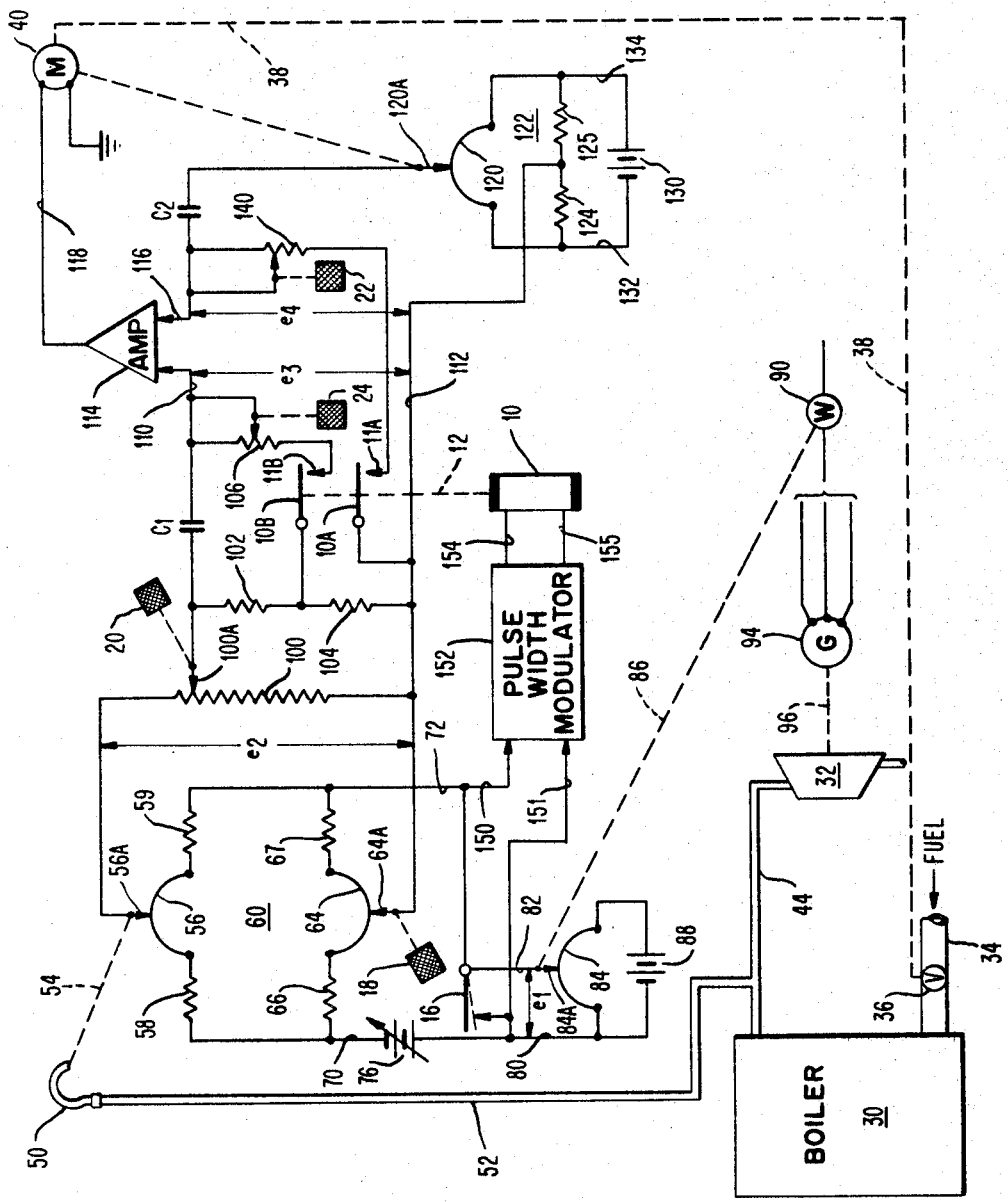
FIG. 1 is a schematic drawing of a modified conventional three-mode controller incorporating the novel means for varying the controller response with load level.

Referring to FIG. 1, it may be seen that the circuit of the controller there illustrated is essentially that of a conventional three-mode controller of a type which is now well known in the art. U.S. Patent 2,830,245, issued to E. T. Davis, shows one form of this type of controller. The present three-mode controller has, however, been altered by the incorporation of a relay 10 which is effective to operate its several movable contacts 10A and 10B. When the relay 10 is energized so that the contacts 10A and 10B are held in contact with the stationary contacts 11A and 11B, respectively, and when the switch 16 is in its closed position the circuitry of the controller is that of a conventional type of three-mode controller which incorporates the usual adjustments for the parameters which determine the controller response. For example, the set point of the controller is effectively established by adjustment of knob 18 while the proportional band, the gain of the controller, is adjusted by knob 20. Similarly, the reset rate of the controller is under the adjustment of knob 22 and the rate time is under the adjustment of the knob 24.

The controller of FIG. 1 is shown as being applied to a non-linear process which includes boiler 30 and its connected turbine 32. The manipulated variable involved in the illustrated control system is the adjustment of the fuel flow in pipe 34 by the modification of the position of the fuel flow rate 36 by the mechanical connection 38 in response to the controller output to the drive unit 40. The modification of the fuel input to the boiler 30 by adjustment of valve 36 serves to modify the rate of production of steam by boiler 30 and to thereby provide a means for correcting the steam pressure in output steam line 44 which carries the superheated steam from boiler 30 to turbine 32.

In FIG. 1 the controlled variable is steam pressure in output line 44. This pressure is detected by Bourdon tube 50 which is shown connected to line 44 by the line 52. Changes in the pressure as detected by Bourdon tube 50 are effective through the mechanical linkage 54 to change the position of the tap 56A on slidewire 56. Slidewire 56 along with its end resistors 58 and 59 are incorporated as one branch of the bridge circuit 60. Another branch of the bridge circuit 60 includes slidewire 64 and its associated contact 64A as well as its end resistors 66 and 67. Both the branch of the bridge circuit 60 which includes slidewire 56 and that which includes slidewire 64 are supplied with power by a power supply connected between lines 70 and 72.

In the conventional controller the power supply for this bridge circuit would normally be a fixed potential such as that supplied by battery 76 which is shown as being adjustable to a desired value. Thus with switch 16 closed the bridge circuit 60 is in a conventional form. When, however, switch 16 is in its illustrated open position the power supply to the bridge 60 is modified by the inclusion of a variable potential $e_1$ which is introduced between lines 80 and 82, by the positioning of slidewire contact 84A of slidewire 84 by mechanical coupling 86. As illustrated the slidewire 84 is in shunt to a power supply 88 which is represented as a battery.

The positioning of the slidewire contact 84A by the mechanical coupling 86 is effected by wattmeter 90 which is connected to measure the power output of generator 94, the generator 94 being connected by shaft 96 to turbine 32. Thus the positioning of the mechanical coupling 86 is an indication of the load on the process and the potential $e_1$ which is the adaptive signal is therefore varied directly in accordance with changes in the load as measured by the wattmeter 90.

It is thus evident that the incorporation of the additional variable potential $e_1$ along with an adjusted fixed potential from battery 76 as a power supply for bridge 60 provides a means for multiplying the deviation of the controlled variable from its set point as the load of the process under control varies. Thus the potential difference between contact 56A which is representative of the magnitude of the controlled variable and potential at contact 64A which is representative of the set point as adjusted by knob 18 is effectively multiplied by a constant represented by battery 76 plus a variable represented by the potential $e_1$.

In the controller of FIG. 1 that potential difference is an input signal in the controller and is represented as potential $e_2$ which is placed across the variably tapped resistor 100 whose associated tap 100A is adjusted by knob 20 in accordance with the desired adjustment of the proportional response or gain of the controller.

The adjustment of the contact 100A determines the current flow through shunting resistors 102 and 104. In addition there is a current path from contact 100A through rate capacitor $C_1$ and an adjustable rate resistor 106 which also flows through resistor 104 to line 112 when the movable contact 10B is closed upon fixed contact 11B by actuation of relay 10. This additional current flow through the resistor 104 is related to the rate of change of the potential $e_2$ by virtue of the incorporation of rate capacitor $C_1$ in the circuits. When the relay contact 10B is closed upon fixed contact 11B, as is the case with the conventional circuit arrangement, there then appears between line 110 and line 112 a potential $e_3$. This potential is indicative of the sum of both the proportional component and the rate component of the response of the controller.

Line 110 provides one input to the controller amplifier 114. The other input to amplifier 114 is by way of line 116 and output to the connected drive unit 40 is by way of line 118. Representing the potential of line 116 with respect to line 112 as $e_4$, amplifier 114 is designed to provide an output signal on line 118 which will cause the motor drive unit 40 to move contact 120A of slidewire 120 until the potential $e_4$ is equal to the potential $e_3$.

Slidewire 120 forms one branch of a second bridge circuit 122. Another branch of bridge circuit 122 is formed by the resistors 124 and 125 which may be of equal value. Line 112 is connected to the point intermediate between the resistors 124 and 125 and the bridge circuit 122 is supplied by fixed potential from battery 130, the battery being connected between the lines 132 and 134 across which both of the branches of the bridge are coupled.

It will be evident that when movable contact 10A is closed upon fixed contact 11A and the potential at the contact 120A is different from the potential on line 112 there will be current flow from contact 120A through the reset capacitor $C_2$ and reset resistor 140, which is adjustable by knob 22, to line 112. Line 116 which forms one of the inputs to amplifier 114 is connected to the point intermediate between the reset capacitor $C_2$ and reset resistor 140. Therefore, in order to maintain a particular potential $e_4$ on line 116 it is necessary that the drive unit 40 continuously move the slidewire contact 120A at a substantially constant rate depending on the potential to be maintained. The potential $e_4$ is thus essentially a time derivative of the potential at contact 120A, therefore the effect in the circuit is to provide a resetting or integral component to the controller response. The controller of FIG. 1 is therefore effective to position the fuel valve 36 in response to not only the magnitude of the deviation of the controlled variable from its set point by virtue of the proportional action but also in accordance with the rate at which the controlled variable changes as well as in accordance with the time integral of the deviation of the controlled variable from its set point. This type of control is commonly referred to as a conventional three-mode control and the circuit of FIG. 1, in so far as it has been described with switch 16 closed and relay 10 energized, effects a fixed proportional action as well as a fixed reset rate and a fixed rate time response in accordance with the adjustments of the several knots 20, 22 and 24.

Process control applications of the type shown in FIG. 1 are non-linear in character and have variable process gains and variable process lags depending upon the load on the process at the time. It has been previously pointed out that it is desirable to modify the several modes of control in accordance with changes in the process load when controlling such a non-linear process. As already described, the opening of switch 16 introduces a variable voltage $e_1$ into the power supply to bridge 60 thus multiplying the proportional response by a factor corresponding to the variable voltage $e_1$ which is itself dependent upon the load as measured by wattmeter 90. A similar result could be accomplished by introducing a multiplier into the output of bridge 60.

The voltage $e_1$ is also utilized in FIG. 1 as an input on lines 150 and 151 to the pulse width modulator 152. The pulse width modulator is preferably designed to produce on its output lines 154 and 155 an energizing current for the connected relay opening coil 10 so that the relay 10 is actuated for a fixed period with the interval between successive actuations being of a duration dependent upon the magnitude of potential $e_1$. Relay 10 is therefore effective to connect the rate resistor 106 and the reset resistor 140 into the control circuit by the closing of contacts 10A and 10B on their respective fixed contacts 11A and 11B for a short fixed period in each of a succession of variable intervals so that the percentage of time those contacts are closed is related to the magnitude of potential $e_1$. When the relay 10 is energized 100% of the time the settings established by the adjustment of knobs 22 and 24 are directly indicative of the reset and rate responses which will result, however when relay 10 is energized only a fraction of the time, the effective reset resistance which is established by resistor 140 is modified as is the effective rate resistance established by resistor 106. Thus if relay 10 is energized 50% of the time the effect on the average as far as the control responses are concerned is the same as would be the case if the resistors 106 and 140 had in fact values twice as great as those adjusted by the settings of knobs 24 and 22, respectively.

It will thus be evident that by periodically energizing relay 10 for a fixed period at intervals variable in duration proportional to the load on the process as measured by the wattmeter 90, both the reset rate and the rate time components of the controlled response are effectively modified so that they are both effectively decreased as the load of the process increases.

The effective resistance parameters established by periodically connecting resistors 106 and 140 may be considered as being in accordance with the time average of the actual resistance in the respective circuit branches.

Figure 1A:
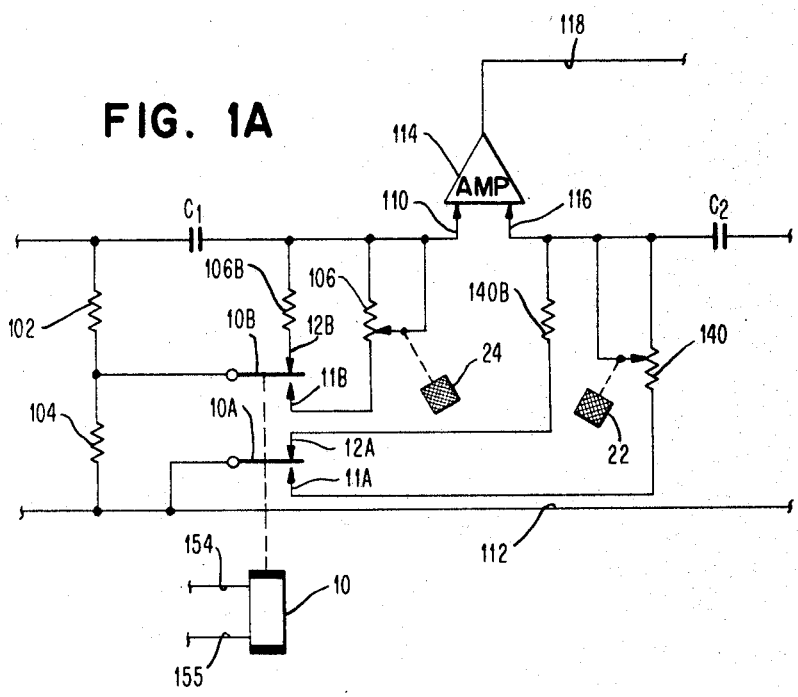
FIG. 1A is a partial circuit diagram of a variation of the rate and reset circuits of FIG. 1.

In FIG. 1A the rate and reset circuits of the controller of FIG. 1 have been modified by the addition of resistors 106B and 140B. Resistor 106B is connected between line 110 and an upper fixed contact 12B which is contacted by the movable contact 10B when relay coil 10 is de-energized. Thus resistor 106B becomes the rate resistor in substitution for resistor 106 so that as relay coil 10 is periodically energized the rate component of the controller response is varied between two levels. In FIG. 1, one of the levels was that established by the infinite resistance of the open circuited relay contact 10B.

Similarly the contact between contacts 10A and 12A completes a circuit between lines 116 and 112 by way of resistor 140B which provides one of the two levels between which the reset component of the controller response can be varied by the actions of relay 10.

While generally relay 10 will control the variation of both the reset rate and the rate time it will be obvious to those skilled in the art that separate relays for each function could be used and those relays could be operated from separate pulse width modulators so that the variations of the separate functions could be different.

In FIG. 2 there is illustrated a modified application of the principle which has been described and illustrated in FIG. 1. In FIG. 2 the process to which the control is applied is a strip treating process which includes pure dead time. The particular process illustrated incorporates a movable roller 200 which works against a fixed roller 202. Roller 200 is adjusted vertically by the positioning element 204 so that the strip of metal 206 is rolled to the desired thickness. In order to control the thickness of the strip of metal 206 as it moves to the left it is necessary to utilize a controller which takes into account the amount of time which is required for correction in the adjustment of the roller 200 to be seen by the thickness gage 210 which is the primary element for measuring the controlled variable in this particular application. Thickness gage 210 is connected by way of line 212 to a recorder 214 which may be any of a number of the conventional types of recorders which incorporate as an output a rotatable shaft 54. In FIG. 2 the rotation of shaft 54 is effective to modify the positioning of contact 56A on slidewire 56. Shaft 54, contact 56A and its associated slidewire 56 as well as the other elements of FIG. 2, which are shown as having reference characters corresponding to reference characters in FIG. 1, are elements which are comparable in structure and function to those of FIG. 1. The control circuit shown in FIG. 2 is similar to that of FIG. 1 with the omission of the elements of the circuit which are effective to incorporate rate action into the control response and with the addition of filter circuit 201 in series with contact 56A to filter out the high frequency noise which may be uncontrollable. The power supply to bridge 60 is shown in FIG. 2 as being a constant potential as established by battery 76 there being no means shown for variation of the proportional band in FIG. 2. FIG. 2 shows a modified means for establishing a pulse width modulator when a process of the type illustrated is involved. Thus, pulse width modulator 152 of FIG. 1 is, in FIG. 2, replaced by the combination of the single-shot circuit 220 and the tachometer 222 and the associated circuitry which is effective to energize relay 10 in a manner similar to that described above with regard to FIG. 1. In FIG. 2 the tachometer 222 is shown as having a pick-off wheel 224 which is coupled by shaft 226 to a rotating element 228 which has incorporated on its periphery a magnetized spot 230. This magnetized spot 230 is rotated about shaft 226 at a speed directly related to the translational velocity of the metal strip 206 and the spot 230 is rotated in juxtaposition to a movable relay contact 240 so that when the spot 230 passes the contact 240 it is pulled into contact with the lower fixed contact 242 to connect line 246 to ground by way of line 248. During the time when the spot 230 is not in juxtaposition with contact 240 the contact 240 is engaged with contact 250 which is the upper fixed contact so that a negative potential is established on line 246 by the battery 252.

Line 246 forms one input to the single-shot circuit 220 while the other is by way of line 254. The line 254 is connected to ground and thus the potential across the input of single-shot circuit 220 varies from a negative potential, for example, during the major portion of rotation of the rotating element 228 to a ground potential or a zero potential for a very short period when the magnetic spot 230 is adjacent to movable contact 240. Thus, the single-shot circuit 220 receives a single pulse at its input upon each revolution of the shaft 226. The pulse at the input of single-shot 220 is effective to produce on output lines 154 and 155 a potential to energize relay 10 for a fixed period. The relay 10 is thus energized to pull contact 10A into contact with contact 11A during a fixed period for each revolution of shaft 226.

This periodic connection of contact 10A and 11A establishes an effective reset rate for the controller which is in dependence upon the speed of the metal strip 206 through the rollers 200 and 202. Thus, the positioning of the roller 200 by drive unit 40 through the mechanical connection 38 and the positioning element 204 is effective to maintain the strip thickness at a value established by the potential on contact 64A which is representative of the set point value.

In many processes and particularly those which have pure dead time there is likely to be uncontrollable noise, that is there are likely to be high frequency components in the input signal from the primary element measuring the controlled variable which signals because of their frequency, are not easily controlled without putting unnecessary wear on the control actuators and the control valves and linkages. It is therefore desirable that such noise signals should be filtered out. The introduction of filter circuits having fixed characteristics has usually caused a relative performance degradation variable with the dynamic characteristics of the process. It is desirable that adaptive controllers which require filtering on the input should incorporate a filter circuit which gives filter action consistent with a given degradation of control performance, to accomplish this the filter time constant is increased as the process dead time and/or time constants increase.

Figure 3:
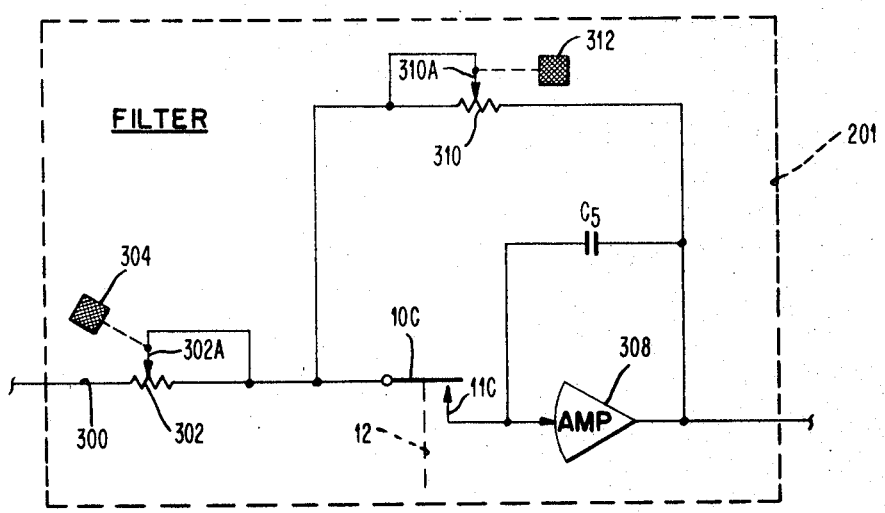
FIG. 3 is a circuit diagram of an adaptive filter which is shown in block form in FIG. 2.

FIG. 3 shows one form of the novel filter circuit which can be incorporated in control circuits such as that shown in FIG. 2 where the filter is designated by the reference character 201. The filter circuit of FIG. 3 has an input line 300 which in the circuit of FIG. 2 would be connected to the contact 56A. The line 300 connects through the variable resistor 302 to movable relay contact 10C. The magnitude of the resistance 302 is subject to adjustment by knob 304 which moves the tap 302A to selectively short out a portion of the resistor 302.

The movable contact 10C is mechanically coupled by way of the mechanical coupling 12 to a relay such as relay 10 of FIG. 2. Upon energization of relay 10 the movable contact 10C is placed in contact with fixed contact 11C thus connecting resistor 302 to the input circuit of high gain amplifier 308. The amplifier 308 is shunted by capacitor $C_5$. The amplifier 308 is likewise shunted by variable resistor 310 whenever the contact 10C is made with the contact 11C. The resistance of 310 is adjusted by knob 312 which varies the positioning of contact 310A to selectively short out a varying amount of resistor 310 to adjust the time constant of the filter.

With relay 10 of FIG. 1 or 2 actuated to make the contact 10C with contact 11C in FIG. 3, the circuit of FIG. 3 acts like an integrating operational amplifier which has a resistance shunting the feedback circuit, namely resistance 310.

Utilizing the high gain amplifier 308 the circuit of FIG. 3 can by adjustment of resistors 302 and 310 to equal values, provide a unity gain factor while making possible a very long time constant. The value of the time constant of the filter circuit of FIG. 3 is given by the product of the value of resistor 310 and the capacity of capacitor $C_5$ multiplied by the ratio of the total period of each cycle of the relay 10 divided by the duration of the portion of that cycle during which the contact 10C is closed upon contact 11C.

Once the required filtering is determined the filter circuit of FIG. 3 will automatically track the process variable and give the same relative control degradation for all values of process load.

In utilizing the filter circuit of FIG. 3 in adaptive control networks as shown in FIG. 2 it is also desirable to include the time constant of the filter in determining the reset rate which is to be effective at various load levels of the process since the filter circuit time constant is a part of the variable dynamics of the system.

Figure 4:
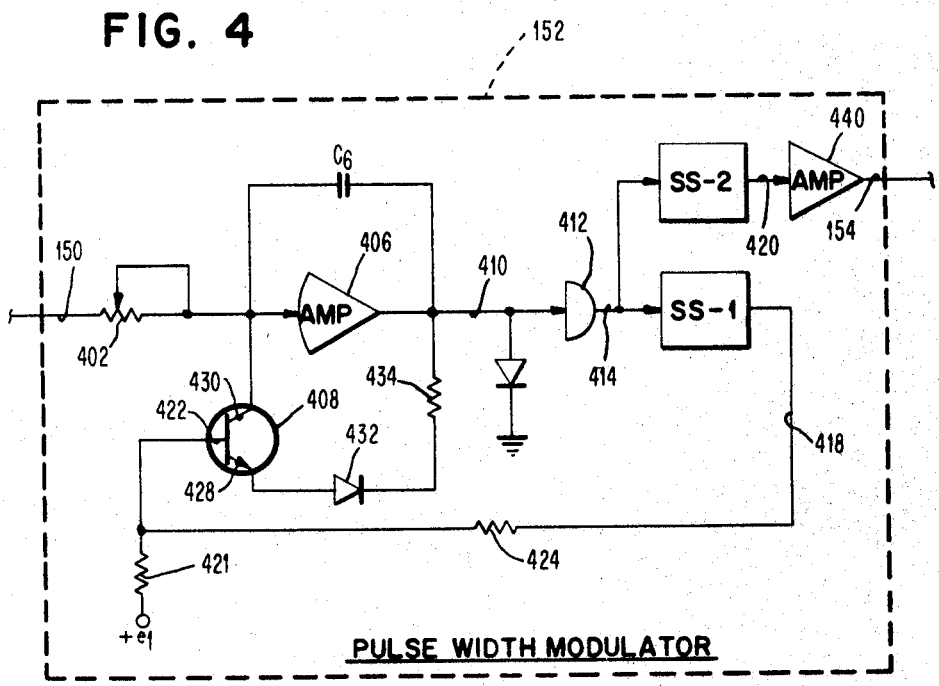
FIG. 4 is a circuit diagram of one of the possible circuits which may be utilized to effect the pulse width modulation required in FIG. 1.

Pulse width modulator 152 is shown in FIG. 1 as a block. It may be constructed as a circuit of the type shown in FIG. 4, for example, although it will be obvious to those skilled in the art that many other modifications of this circuit and different designs are possible for obtaining the desired modulation of the percentage of time that a relay 10 is energized. In FIG. 4 input line 150 connects through a variable input resistor 402 to a high gain amplifier 406 which in conjunction with its shunting capacitor $C_6$ provides an integrating effect. Amplifier 406 is selectively shunted by a switching circuit which utilizes transistor 408 as the switching element. Transistor 408 which is shown as an n-p-n type may be considered as being normally nonconductive in which case the input signal on line 150, which will be assumed to be of a positive value, will produce on the output line 410 of amplifier 406 a negative potential of constantly increasing magnitude.

Figure 5:
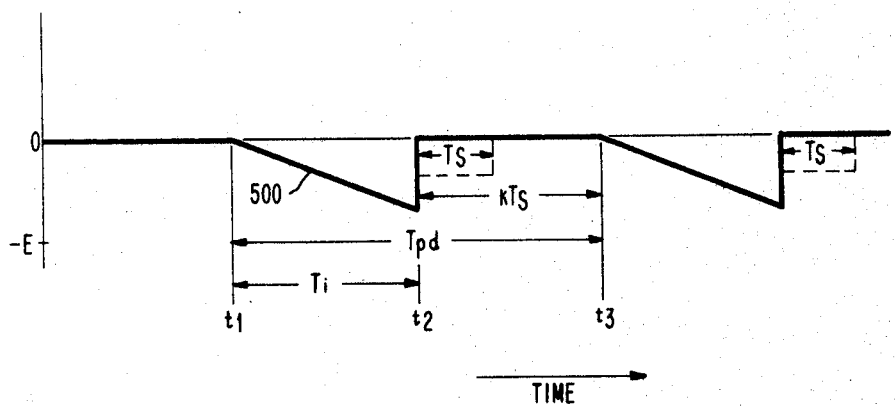
FIG. 5 is a graphic illustration useful in the explanation of the circuit diagram of FIG. 4.

Referring to the wave form shown in FIG. 5 the solid line 500 represents this constantly increasing negative potential between the time $t_1$ and $t_2$. When the potential of output line 410 has reached the value $-E$ after a variable period $T_1$ the gate circuit 412 is effective to produce a positive output on line 414 starting at $t_2$. This signal triggers the two single-shot circuits SS–1 and SS–2 which then respectively produce for their individual predetermined periods $kT_s$ and $T_s$ a changed potential on their respective output lines 418 and 420. Thus, for example, an input pulse on line 414 to the single-shot circuits SS–1 and SS–2 which is a positive going negative voltage which goes from $-10$ volts to ground, for example, can initiate on the output lines 418 and 420 a similar positive going potential from $-10$ volts to ground. That ground potential on the lines 418 and 420 is shown as continuing for the predetermined set time periods depending upon the adjustments of the circuits SS–1 and SS–2. At the end of those periods the potentials on lines 418 and 420 may return to a $-10$ volt potential. Single-shot circuits of the type which may be utilized for the blocks shown as SS–1 and SS–2 in FIG. 4 are shown and described in a U.S. patent application Ser. No. 399,216 by C. W. Ross.

When the signal on line 418 goes from a $-10$ volt potential to ground, transistor 408 is biased to an "on" state by the positive potential which appears at base 422. The conductive transistor 408 then shorts out amplifier 406 and capacitor $C_6$. As shown in FIG. 4 transistor 408 has its base terminal biased by potential $+e_1$ which is connected by way of resistor 421 to base terminal 422. Output line 418 from the circuit SS–1 is connected through resistor 424 to the base connection 422. Whenever the potential on line 418 is at a $-10$ volt potential the base 422 is not sufficiently positive with respect to the emitter 428 to make transistor 408 conductive. However, when the signal on line 418 goes to ground potential the base 422 becomes sufficiently positive with respect to emitter 428 to make transistor 408 conductive so that there is a current flow from the input of amplifier 406, through collector 430, through the emitter 428 and then through diode 432 and its series resistor 434 to line 410.

During the period that the transistor 408 is in an "on" condition, amplifier 406 and capacitor $C_6$ cease to integrate and as shown in FIG. 5 the negative potential on line 410 decreases at time $t_2$.

Likewise at time $t_2$ the single-shot circuit SS–2 is triggered and has produced on its output line 420 a pulse having a duration dependent upon the setting of the circuit SS–2. This pulse is amplified by amplifier 440 to produce an output on line 154 which is of the desired polarity and is sufficient power to actuate relay 10 of FIG. 1. Thus the circuit of FIG. 4 is effective to cause relay 10 of FIG. 1 to be energized for a fixed period as shown in FIG. 5 by the dash line and labeled $T_s$. This particular period of energization of relay 10 is effected at intervals which are directly dependent upon the magnitude of the input signal on line 150 and the time period during which the pulse output is produced on line 418 from SS–1. This latter time period is labeled $kT_s$ in FIG. 5 and takes up the period between time $t_2$ and time $t_3$. Thus the total period T for the circuit of FIG. 4 is that period between the times $t_1$ and $t_3$ which period tends to increase with a decrease in the magnitude of the input on line 150 of FIG. 4 so that as the input on line 150 decreases the duration of the impulse output on line 154 becomes a smaller percentage of the total period.

It will be evident from FIG. 5 that the cyclic operation of the circuit of FIG. 4 is continuous as long as there is a signal on line 150, for capacitor $C_6$ begins integrating the input on line 150 again when transistor 408 is made non-conductive by the disappearance of the pulse signal on line 418.

In order that the pulsing of relay coil 10 in FIG. 1 will cause the least interference with the response of the controller it is desirable that the period T be kept as short as possible. Therefore the parameters of the integrating circuit consisting of amplifier 406 and capacitor $C_6$ as well as the settings of SS–1 and SS–2 should be chosen accordingly.

The manner in which the circuit of FIG. 1 accomplishes the desired adaptive control may be further illustrated by the pertinent mathematical relationships.

As previously mentioned it has been found that the desired reset rate for an adaptive controller is a function of the reciprocal of the sum of a fixed value and a variable value. Thus, where $R_d$ = desired reset rate,
$T_v$ = variable component of the process dynamics,
$T_c$ = fixed component of the process dynamics,
$k_1$ = constant, then $$R_d = \frac{k_1}{T_c + T_v} \quad (1)$$

The reset rate $R_c$, established by the controller of FIG. 1, may be described as follows:

$$R_c = \frac{1}{R_2 C_2 \frac{T_{pd}}{T_s}} \quad (2)$$

where $R_2$ = resistance of resistor 140.
$C_2$ = capacitance of capacitor $C_2$.

From FIG. 5, $$T_{pd} = kT_s + T_i \quad (3)$$

therefore, $$R_c = \frac{T_s}{R_2 C_2 (kT_s + T_i)} = \frac{k_2}{kT_s + T_i} \quad (4)$$

It will be evident that Equation 4 is of the same form as Equation 1. Therefore, in FIG. 1 the constant component $T_c$ is supplied by SS–1 (FIG. 4) which provides the term $kT_s$ and the variable component is supplied by the saw-tooth generator which includes amplifier 406 and capacitor $C_6$ (FIG. 4), term $T_i$. The period $T_i$ is proportional to $1/e_1$ where $e_1$, as shown in FIG. 1, is representative of the process variable which is indicative of the variations in process dynamics. It will, therefore, be evident that the controller of FIG. 1 can establish a response having the desired reset rate $R_d$. Should the process be such that $T_v$ is not proportional to $1/e_1$ then a shaping network may be used in the input line 150 (FIGS. 1 and 4) to establish the desired relationship.

Similarly, the desired rate time $R_t$ may be expressed as:

$$R_t = k_3(T_c + T_v) \quad (5)$$

and since the rate time response $R_{tc}$ established by the controller of FIG. 1 is approximated by:

$$R_{tc} = R_1 C_1 \frac{T_{pd}}{T_s} \quad (6)$$

where $R_1$ = resistance of resistor 102 plus the resistance of 106 times the ratio of the sum of resistances 102 and 104 to that of 104

$C_1$ = capacity of capacitor $C_1$ then $$R_{tc} = \frac{R_1 C_1}{T_s}(kT_s + T_i) \quad (7)$$

The form of Equation 7 being like that of Equation 5 it is evident that the controller of FIG. 1 can provide the desired rate time response with the period $kT_s$ representing the constant component $T_c$ and the period $T_i$ representing the variable component $T_v$.

From the above relationships the desired Laplace transform notation for the adaptive controller of FIG. 1 can be approximated as follows:

$$G(s) = K(k_c + k_v)\left[1 + sk_3(T_c + T_v) + \frac{k_1}{s(T_c + T_v)}\right] \quad (8)$$

$$G(s) = \text{controller gain}\left[1 + s \times \text{rate time} + \frac{\text{reset rate}}{s}\right] \quad (9)$$

where $k_v$ is proportional to the reciprocal of the system gain, $k_c$ is a constant gain term and K, $k_1$ and $k_3$ are proportionality constants.

That the controller of FIG. 1 provides the desired control response is evident from the above discussion. The desired control response may also be executed by other means. For example, ordinary analog computing components can be utilized as can digital computers. As an example of how the desired control response can be accomplished with analog components we can, for simplicity of explanation, consider the case in which the fixed part of the system dynamics $T_c$ is small compared to the variable part $T_v$. Then if both the process gain and the system dynamics vary with the load as represented by $e_1$, the desired control response can be expressed in Laplace transform notation as:

$$G(s) = Kk_v\left[1 + sk_3T_v + \frac{k_1}{sT_v}\right] \quad (10)$$

or $$G(s) = Kk_v + sKk_vk_3T_v + \frac{Kk_vk_1}{sT_v} \quad (11)$$

If we assume that $$k_v \sim e_1 \text{ or } k_v = \frac{K'}{K}e_1$$

$$T_v \sim 1/e_1, \text{ or } T_v = \frac{k'_3}{k_3}\frac{1}{e_1}, \text{ and } k'_1 = \frac{k_1 k_3}{k'_3}$$

then the desired control response can be expressed by:

$$G(s) = K'e_1 + sK'k'_3 + \frac{K'k'_1 e_1^2}{s} \quad (12)$$

Figure 6:
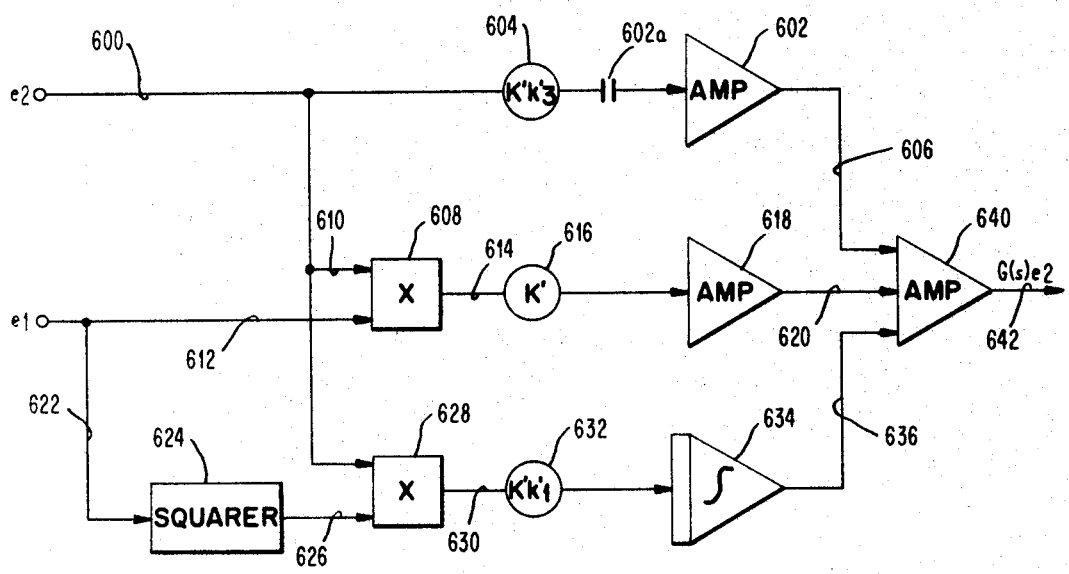
FIG. 6 is a schematic diagram of another type of controller incorporating adaptive control.

Analog computer components may be utilized to provide a controller having a control response in accordance with the transfer functions of Equation 12 as shown in FIG. 6. In that circuit $e_1$ and $e_2$ are representative of the adaptive signal and the error signal, respectively, as they are in FIG. 1. In FIG. 6 however, $e_2$ is not a function of $e_1$ as in FIG. 1 but instead represents the deviation of the controlled variable from its set point.

The signal $e_2$ representing the error to be corrected is introduced on line 600 which connects to the differentiating operational amplifier 602 through an adjustable potentiometer 604 which is adjusted to introduce the factor $K'k'_3$ of Equation 12. The resulting derivative from amplifier 602, which is symbolically shown as including capacitor 602a, is produced on line 606 as the rate signal in accordance with the transfer function appearing as the second term in Equation 12.

To obtain the proportional signal $e_2$ is introduced as one input to multiplier 608 on line 610. The other input on line 612 is $e_1$, which is the adaptive signal. The output of multiplier 608 on line 614 is then $e_1 e_2$ and that signal is modified by adjustable potentiometer 616 which introduces the factor $K'$. The signal to operation amplifier 618 and hence its output on line 620 is the proportional signal for the controller and is in accord with the transfer function which is the first term on the right hand side of Equation 12.

The reset signal is obtained by introducing the signal $e_1$ on line 622 into the squaring circuit 624 to produce the signal $e_2^2$ on line 626. The signal $e_1^2$ is then multiplied by $e_2$ in the multiplying circuit 628. The effect of the output of circuit 628 on line 630 is modified by the adjustable potentiometer 632 which is adjusted in accordance with $K'k'_1$ so that the integrating amplifier 634 which receives the signal from potentiometer 632 produces a reset signal on line 636 in accordance with the transfer function which is the last term of Equation 12.

The proportional signal on line 620, the rate signal on line 606 and the reset signal on line 636 are summed by operational amplifier 640 to produce the desired control response signal $G(s)e_2$ on line 642.

The various elements of FIG. 6 may be any of the standard analog computer components for carrying out the functions described.

In concurrently filed U.S. patent application Ser. No. 405,038, John W. Schwartzenberg, a coworker of mine, has claimed those novel aspects of the present disclosure which are not claimed herein.

What is claimed is:

1. In a process controller for producing a reset response in a manipulated variable, the combination of
   means for establishing a plurality of different instantaneous rates for said reset response,
   and means operable in dependence upon the dynamics of the process under control for actuating said last named means so as to establish said different instantaneous rates for different portions of recurring time intervals so that the time average of said rates has a predetermined relationship to said process dynamics.

2. A process controller as called for in claim 1 in which said plurality of different instantaneous rates consists of one rate of magnitude other than zero and another rate of magnitude equal to zero.

3. In a process controller for producing a reset response in a manipulated variable, the combination of
   means for varying the instantaneous rate of said reset response between two levels,
   and means for actuating said varying means to provide an instantaneous reset rate at one of said levels for portions of recurring periods of duration dependent upon the dynamics of the process under control and an instantaneous reset rate at the other of said levels during the remaining portions of said periods.

4. In a process controller for producing a proportional and a reset response in a manipulated variable, the combination of
   means for establishing a proportional response of magnitude related to a fixed value and a value variable in accordance with changes in the gain of the process under control,
   means for establishing a particular rate for said reset response,
   and means for rendering said last named means inoperable for portions of recurring periods such that the effective time average of the rate of said reset response is variable in accordance with a fixed value and a variable related to the time constant of said process.

5. A process controller for producing a proportional and a reset response in a manipulated variable comprising
   means for establishing a proportional response for said manipulated variable in accordance with a constant value representing the fixed portion of the gain of said process and a variable value representing the variable portion of said process gain,
   and means for periodically varying the reset response between predetermined values, the periodicity of said variation being varied in accordance with variations in the time constant of said process.

6. In a process controller for producing a proportional and a reset response in the manipulated variable of a dead time process whose controlled variable includes uncontrollable noise signals, the combination of
   means for filtering the noise signal by attenuating the higher frequency components of the controlled-variable signal, said filtering means including components for establishing two possible values for the time constant of said filtering means,
   means for varying said time constant of said filtering means between said two values,
   means for establishing two possible values for the rate of said reset response,
   means for varying said rate of said reset response between said two reset rate values,
   and means for simultaneously actuating said time constant varying means and said reset rate varying means to first ones of said time constant and reset rate values for portions of recurring periods of duration dependent upon the dynamics of the process under control and to the other of said values during the remaining portions of said periods, whereby the time average of the filter time constant and the reset rate are varied in accordance with changes in the dead time of said process.

7. In a process controller for controlling a dead time process whose controlled variable includes uncontrollable noise signals, the combination of
   filter means for inserting a predetermined time constant into the response of said controller,
   means for selectively removing said time constant from said response,
   and means operable in response to a process variable indicative of said dead time to actuate said last named means to remove said time constant from said response for recurring periods such that the average time constant of said filter means varies with said dead time.

8. An adaptive filter for process control circuits comprising
   a high gain amplifier having an input and an output connection,
   a capacitor connected between said input and output connections to establish one value for the time constant of said filter,
   a first resistor having one end acting as an input to said filter,
   switching means operable in response to an actuating signal to connect the other end of said first resistor to the said input connection of said amplifier,
   a second resistor connected between said output connection of said amplifier and said other end of said first resistor,
   and means for producing an actuating signal for said switching means during a portion of a series of recurring time intervals so that said portion represents a fraction of said intervals dependent upon the value of a variable of said process which is indicative of changes in the time constant of said process,
   whereby the effective time constant of said filter is varied with variations in the time constant of said process.

9. In a controller for regulating a variable of a strip treating process having a transportation lag, the combination of
   means operable upon actuation to introduce a reset component in the response of said controller,
   means for producing a signal for actuating said last named means for a fixed period of time at recurrent variable intervals including a rotatable element having a magnetized spot thereon, means for rotating said element at a speed related to the linear velocity of said strip, a contact element in juxtaposition with the rotational path of said magnetized spot and operable to generate a pulse for each revolution of said rotatable element, and means responsive to said pulse for generating said actuating signal for a fixed period of time following said pulse whereby said controller will produce effective reset action which is related to the time average of the instantaneous reset rate periodically established by the introduction of said reset component.

10. A process controller for a strip process having dead time comprising means for producing a first signal indicative of the deviation of the controlled variable of said process from its set point, means for producing a second signal indicative of the deviation of the magnitude of the manipulated variable of the process from a certain value, means for variably modifying one of said first and second signals in accordance with a time function of that signal, means for establishing the magnitude of said variable modification in accordance with the dead time of the process including a rotary element engaged by said strip and rotated at the rate of feed of said strip, a magnetized area at a particular point on said rotary element, contact means positioned adjacent the path of said magnetized area and operable to make a pair of contacts upon passage of said magnetized area past said contacts, means for changing the parameters of said modifying means from one predetermined level to another for a fixed period in response to the making of said pair of contacts, and means for modifying the magnitude of the manipulated variable of said process to tend to maintain the modified one of said first and second signals equal in magnitude to the other of said first and second signals.

11. A process controller comprising a first bridge circuit connected across a potential source and having a variable tap in one branch set in accordance with the set point of the process and a variable tap in another branch set in accordance with a measured value for the controlled variable, a shunting resistor connected between said taps, an adjustatble tap on said shunting resistor positioned to establish the desired proportional response for said controller, a second bridge circuit connected across a potential source and having a variable tap positionable along an associated slidewire in one branch of said second bridge and a fixed tap in another branch, a connection between one of said taps of said second bridge circuit and one of said taps of said first bridge circuit, a reset capacitor having one terminal connected to said variable tap of said second bridge circuit, a variable reset resistor having one terminal connected to the other terminal of said capacitor, a relay having a contact for connecting another terminal of said reset resistor to said fixed tap of said second bridge circuit only when said relay is in one state, amplifier means having an input connected to said one terminal of said reset resistor and the adjustable tap of said shunting resistor and operable to produce an output signal whenever the potentials at said one terminal of said reset resistor and said tap of said shunting resistor are unequal, a drive unit connected to the output of said amplifier and operable in response to said output to change the magnitude of the manipulated variable of the process, means connecting said drive unit to said variable tap on said slidewire of said second bridge circuit so that movement of said drive unit in response to said amplifier output is in such a direction as to tend to reduce the difference in the potentials connected to the input of said amplifier, means responsive to a variable of the process which changes with changes in the time constant of the process for actuating said relay into said one state for a fixed periodic time representing a percentage of the total time related to said last named variable whereby the time average of the reset control effects established by the periodic connection of said reset resistor by said relay is modified in accordance with said last named variable to accommodate the control of said manipulated variable to changes in the time constant of the process.

12. An adaptive process controller comprising, means for producing an error signal in accordance with the deviation of the controlled variable from its set point, means for producing an adaptive signal in accordance with the magnitude of a process variable indicative of variations in the characteristics of said process, and means for controlling the manipulated variable of said process in response to both said error signal and said adaptive signal, a characteristic of said response to said error signal being in accordance with a transfer function which includes the expression $$\frac{k}{s(T_c+T_v)}$$

in which $T_v$ is related to the reciprocal of said adaptive signal.

13. An adaptive process controller comprising, means for producing an error signal in accordance with the deviation of the control variable from its set point, means for producing an adaptive signal in accordance with the magnitude of a process variable indicative of variations in the characteristics of said process, means for controlling the manipulated variable of the process in response to both said error signal and said adaptive signal, the characteristics of said response to said error signal including a proportional response in accordance with a transfer function which includes a constant value plus a variable value directly related to said adaptive signal and a reset response in accordance with a transfer function which includes a constant divided by a denominator including the Laplace transform operator times the sum of a fixed time constant and a variable time constant which is related to the reciprocal of said adaptive signal.

14. An adaptive process controller comprising, means for producing an error signal in accordance with the deviation of the control variable from its set point, means for producing an adaptive signal in accordance with the magnitude of a process variable indicative of variations in the characteristics of said process, means for controlling a manipulated variable of the process in response to both said error signal and said adaptive signal, the characteristics of said response to said error signal including a proportional response in accordance with the transfer function $k_c+k_v$.

15. An adaptive process controller comprising, means for producing an error signal in accordance with the deviation of the control variable from its set point, means for producing an adaptive signal in accordance with the magnitude of a process variable indicative of variations in the characteristics of said process, means for controlling the manipulated variable of said process in response to both said error signal and said adaptive signal, the characteristics of said response including a reset rate variable in accordance with a transfer function which includes an expression having a constant divided by the Laplace operator times a quantity including the sum of a fixed time constant value and a variable time constant value, said variable time constant value being related to the reciprocal of said adaptive signal.

16. In a process controller having a resistance-capacitance network for providing reset action, the combination of relay means operable to connect said resistance-capacitance network to establish said reset action when said relay is in a particular state, pulse width modulation means connected to said relay and operable to establish a fixed period during which said relay is energized to said particular state, said fixed period occurring once during each of a series of recurring periods of variable duration proportional to the sum of a constant value established to represent the constant part of the dynamics of the system and a variable value established in accordance with the variable part of the system dynamics, means responsive to a process variable whose value is indicative of the said variable system dynamics for providing an input signal to said pulse width modulator to establish the said variable value.

17. In a process controller utilizing a resistance-capacitance network to establish its reset action, the combination of relay means operable to selectively disconnect said resistance-capacitance network to stop the charging current from flowing in said network when said relay means is in a particular state, pulsing means connected to said relay means and operable to place said relay means in said particular state for a variable portion of the recurring periods of said pulsing means, said variable portion being determined by the sum of a constant value representing the constant part of the process dynamics and a variable value representing a variable portion of said process dynamics, the remaining portion of each of said periods being a fixed period when said relay means is in another state which will allow said charging current to flow.

18. A method for providing adaptive control of a process comprising the steps of producing an error signal indicative of the deviation of the controlled variable from its set point, producing an adaptive signal indicative of the variations in the dynamics of said process, altering the manipulated variable in accordance with a proportional action and a reset action, said proportional action being related to the magnitude of said error signal by a factor which is the sum of a constant value and a value variable directly with said adaptive signal, and said reset action being related to the magnitude of said error signal by a factor which includes a term whose value is related to the reciprocal of the sum of a constant representing the fixed portion of the system dynamics and a variable related to the reciprocal of said adaptive signal.

19. In a process controller for producing in a manipulated variable a response which is a predetermined function of the deviation of the controlled variable from its set point, the combination of means for selectively establishing a plurality of different predetermined functions for said response, and means operable in dependence upon the dynamics of the process under control for actuating said last named means so as to establish each of said plurality of different functions for different portions of recurring time intervals so that the time average of said functions has a predetermined relationship to said process dynamics.

20. A process controller comprising a first bridge circuit connected across a potential source and having a variable tap in one branch set in accordance with the set point of the process and a variable tap in another branch set in accordance with a measured value for the controlled variable, a shunting resistor connected between said taps, an adjustable tap on said shunting resistor positioned to establish the desired proportional response for said controller, a second bridge circuit connected across a potential source and having a variable tap positionable along an associated slidewire in one branch of said second bridge and a fixed tap in another branch, a connection between one of said taps of said second bridge circuit and one of said taps of said first bridge circuit, a reset capacitor having one terminal connected to said variable tap of said second bridge circuit, a variable reset resistor having one terminal connected to the other terminal of said capacitor, a relay having a contact for connecting another terminal of said reset resistor to said fixed tap of said second bridge circuit only when said relay is in one state, a pulse width modulator connected to said relay so as to energize said relay for a fixed portion of a variable each of successive periods variable in dependence upon the magnitude of the input signal to said modulator, amplifier means having an input connected to said one terminal of said reset resistor and the adjustable tap of said shunting resistor and operable to produce an output signal whenever the potentials at said one terminal of said reset resistor and said tap of said shunting resistor are unequal, a drive unit connected to the output of said amplifier and operable in response to said output to change the magnitude of the manipulated variable of the process, means connecting said drive unit to said variable tap on said slidewire of said second bridge circuit so that movement of said drive unit in response to said amplifier output is in such a direction as to tend to reduce the difference in the potentials connected to the input of said amplifier, and means responsive to a variable of the process which changes with changes in the time constant of the process for producing an input signal to said modulator whereby the time average of the reset control effects, established by the periodic connection of said reset resistor by said relay, is modified in accordance with said last named variable to accommodate the control of said manipulated variable to changes in the time constant of the process.

21. A method for providing adaptive control of a process comprising the steps of producing an error signal indicative of the deviation of the controlled variable from its set point, producing an adaptive signal indicative of the variations in the dynamics of said process, and altering the manipulated variable in accordance with a reset action, said reset action being related to the magnitude of said error signal by a factor which includes a term whose value is related to the reciprocal of a sum of a constant representing the fixed portion of the system dynamics and a variable related to the reciprocal of said adaptive signal.

22. A method for providing adaptive control of a process comprising the steps of producing an error signal indicative of the deviation of the controlled variable from its set point, producing an adaptive signal indicative of the variations in the dynamics of said process, and altering the manipulated variable in accordance with a proportional action, said proportional action being related to the magnitude of said error signal by a factor which is the sum of a constant value and a value variable directly with said adaptive signal.

References Cited

UNITED STATES PATENTS

| | | |
|---|---|---|
| 2,806,192 | 9/1957 | Bristol. |
| 3,096,471 | 7/1963 | Taylor. |
| 3,149,270 | 9/1964 | Smith et al. |

ORIS L. RADER, *Primary Examiner.*

T. LYNCH, *Examiner.*

UNITED STATES PATENT OFFICE
CERTIFICATE OF CORRECTION

Patent No. 3,391,316            July 2, 1968

Charles W. Ross

It is certified that error appears in the above identified patent and that said Letters Patent are hereby corrected as shown below:

Column 5, line 4, "knots" should read -- knobs --; line 24, "opening" should read -- operating --. Column 11, line 13, "$e_2^2$" should read -- $e_1^2$ --.

Signed and sealed this 9th day of December 1969.

(SEAL)
Attest:

Edward M. Fletcher, Jr.            WILLIAM E. SCHUYLER, JR.
Attesting Officer                      Commissioner of Patents